United States Patent [19]

Frankeny

[11] Patent Number: 5,793,223
[45] Date of Patent: Aug. 11, 1998

[54] REFERENCE SIGNAL GENERATION IN A SWITCHED CURRENT SOURCE TRANSMISSION LINE DRIVER/RECEIVER SYSTEM

[75] Inventor: Richard Francis Frankeny, Elgin, Tex.

[73] Assignee: International Business Machines Corporation, Armonk, N.Y.

[21] Appl. No.: 703,317

[22] Filed: Aug. 26, 1996

[51] Int. Cl.[6] .................................................. H03K 17/16
[52] U.S. Cl. ............................. 326/30; 326/83; 326/86
[58] Field of Search ................................. 326/21, 27, 30, 326/33, 82–83, 86

[56] References Cited

U.S. PATENT DOCUMENTS

| | | |
|---|---|---|
| 4,453,121 | 6/1984 | Noufer . |
| 4,614,882 | 9/1986 | Parker et al. . |
| 4,634,894 | 1/1987 | Shu et al. . |
| 4,975,599 | 12/1990 | Petrovick, Jr. et al. . |
| 5,004,986 | 4/1991 | Bohrer . |
| 5,111,080 | 5/1992 | Mizukami et al. ............... 326/30 |
| 5,157,269 | 10/1992 | Jordan et al. . |
| 5,173,656 | 12/1992 | Seevinck et al. . |
| 5,218,248 | 6/1993 | Nagao . |
| 5,373,226 | 12/1994 | Kimura . |
| 5,399,960 | 3/1995 | Gross . |
| 5,414,583 | 5/1995 | Jordan . |
| 5,422,608 | 6/1995 | Levesque . |
| 5,448,159 | 9/1995 | Kojima et al. . |
| 5,448,182 | 9/1995 | Countryman et al. ............ 326/83 X |
| 5,453,679 | 9/1995 | Rapp . |
| 5,578,939 | 11/1996 | Beers et al. ........................ 326/30 |
| 5,596,285 | 1/1997 | Marbot et al. ..................... 326/30 |
| 5,604,450 | 2/1997 | Borkar et al. ...................... 326/82 |

*Primary Examiner*—David R. Hudspeth
*Attorney, Agent, or Firm*—Casimer K. Salys

[57] ABSTRACT

A reference generation and switched current source system suitable to convey data signals over a transmission line with minimum reflection through the use of active termination, transmission line current biasing, and the use of a shared referenced voltage derived from the characteristic impedance of the line as refined by integrated circuit transistor parameters at the transmitter and receiver. The integrated circuit chips connected by the transmission line each have a reference generator which defines a bias voltage for an active terminator, a bias current for injection into the transmission line, and a switched current source. The reference node interconnecting the transmitting and receiving devices conveys a voltage nominally twice the voltage at which the transmission line is biased and nominally twice the voltage increase introduced by the switched current source. The switched current source at the transmitting end, the bias current provided at the transmitting end, and the bias level of the active terminator at the receiving end of a transmission line are derived directly from the voltage on the reference node while compensating for the unique characteristics of the integrated circuit transistors in the respective chips.

14 Claims, 4 Drawing Sheets

ACTIVE TERMINATOR

DATA STATE DETECTOR

REFERENCE SIGNAL GENERATION IN A SWITCHED CURRENT SOURCE TRANSMISSION LINE DRIVER/RECEIVER SYSTEM

CROSS-REFERENCE TO RELATED APPLICATIONS

The present application is related to co-pending U.S. patent applications having Ser. No. 08/376,708, filed Jan. 23, 1995, and Ser. No. 08/438,134, filed May 8, 1995. The identified co-pending applications are assigned to the assignee of the present application.

FIELD OF THE INVENTION

The present invention is generally related to interfaces used in the driving and receiving of electrical signals over transmission lines. More particularly, the invention relates to input and output configurations used with bus type transmission lines interconnecting multiple integrated circuit chip devices. The invention focuses on refinements which eliminate reflections when bus lines are driven with current sources.

BACKGROUND OF THE INVENTION

Computer system clock speeds continue to increase, with commercial microprocessors now routinely operating at 200 MHz clock rates. The measurement of data signals subject to change at such high frequencies is becoming more difficult because of impedance mismatch induced reflections on the connecting lines. Namely, the characteristic impedance of the lines, whether the lines are single wires or part of a bus, routinely do not match the input impedance of the terminating load, where such load is commonly the input of an integrated circuit device. Therefore, at the frequencies in question, it has become necessary to consider the transmission line effects of the data communication path, and particularly from the perspective of trying to having the impedance at the terminating load match the characteristic impedance of the transmission line. Improving the impedance match minimizes reflections of the signal, thereby reducing the settling time of the signal and decreasing the delays necessary to accurately sample the signal at the receiving end. Thus, the goal is to have the impedance of the terminating device exactly sink the current sent by the transmitting device.

One implementation of such a system is described in copending U.S. patent application Ser. No. 08/438,134, filed May 8, 1995, the subject matter of which is incorporated herein by reference. The noted patent application describes a bi-directional transmission line driver/receiver which utilizes current source transmission line drivers in conjunction with matching impedance current sinks to minimize transmission line signal reflections. The patent application focuses on the use of actively adjusted terminators and variable current source transmission line drivers to minimize signal reflections in the context of integrated circuit devices whose manufacturing processes do not lend themselves to precise control of driving and termination characteristics.

The application in question also extends the fundamental concept to multi-level logic signals, whereby data is encoded into signals individual characterized by incremented differences in current levels. Again, active matching at the terminating or receiving end is crucial to ensure decoding of the current levels.

Although the underlying approaches pursued by the above-identified application are viable and beneficial, the reference generators used to actively adjust the transmitted currents and receiving end impedance levels are in need of further refinement. In particular, as to the reference generator, extended analyses of CMOS devices has established that the statistic dependence required between the threshold voltage and transconductance to implement the reference generator in the above-noted patent application is not as reliable as originally perceived. Thus, there has developed a need for a refined reference generator and related switched current sources with improved transmission line operational characteristics for sending high frequency signals between integrated circuit chips.

SUMMARY OF THE INVENTION

In one form, the invention relates to a system having multiple integrated circuit devices interconnected through a transmission line bus, the bus being situated to transmit data signals between devices employing current source drivers and receivers, whereby an apparatus is operable to match current source drivers and receivers in two or more integrated circuit devices and as such comprises a means for generating in a first device a reference signal nominally being twice the magnitude of the data signal transmitted between selected devices over one or more lines of the bus, a means for generating in the first device a first bias signal operable with a first terminator to regulate the reference signal, a means for generating a second bias signal operable to inject a first bias current into a first line of the bus, and a second terminator in the first device connected to the first line of the bus and responsive to the first bias signal and a first bias current injected by a second device into the first line to establish a voltage on the first line of the bus nominally half the reference voltage. In a variation of the invention involving the single reference voltage and multiple line bus, further features comprise a means for injecting a second bias current into a second line of the bus responsive to the second bias signal, and a third terminator in the first device connected to the second line of the bus and responsive to the first bias signal and a second bias current injected by the second device into the second line to establish a voltage on the second line of the bus nominally half the reference voltage.

In a particularized form of the invention, the reference signal is generated by the interaction on a shared node of reference circuits in each of the integrated circuit devices, which reference signal is then used by individual device amplifiers, current mirrors, matching terminators, and feedback compensation circuits to establish matching bias levels as appear on the data signal lines of the bus. Since the reference level and bias signals are derived from the use of the characteristic impedance of the transmission line, more commonly the data signal bus, biasing and impedance matching is accomplished at the input/output connections of each integrated circuit chip. The refinements in the present invention are unique in that they involve the interconnection of multiple chips using a common reference node so that reference generators within individual chips provide matching bias, impedance and current source levels over an extended range of integrated circuit field effect transistor threshold voltages and transconductance values. The reference node ensures that the bias levels in the individual chips match the terminator characteristics so that the switched current generated in one chip is perfectly sunk by the terminator in another chip while matching the transmission line impedance and substantially eliminating reflections.

These and other features of the invention will be more clearly understood and appreciated upon considering the detailed embodiment set forth hereinafter.

DESCRIPTION OF THE PREFERRED EMBODIMENT

Figure 1:
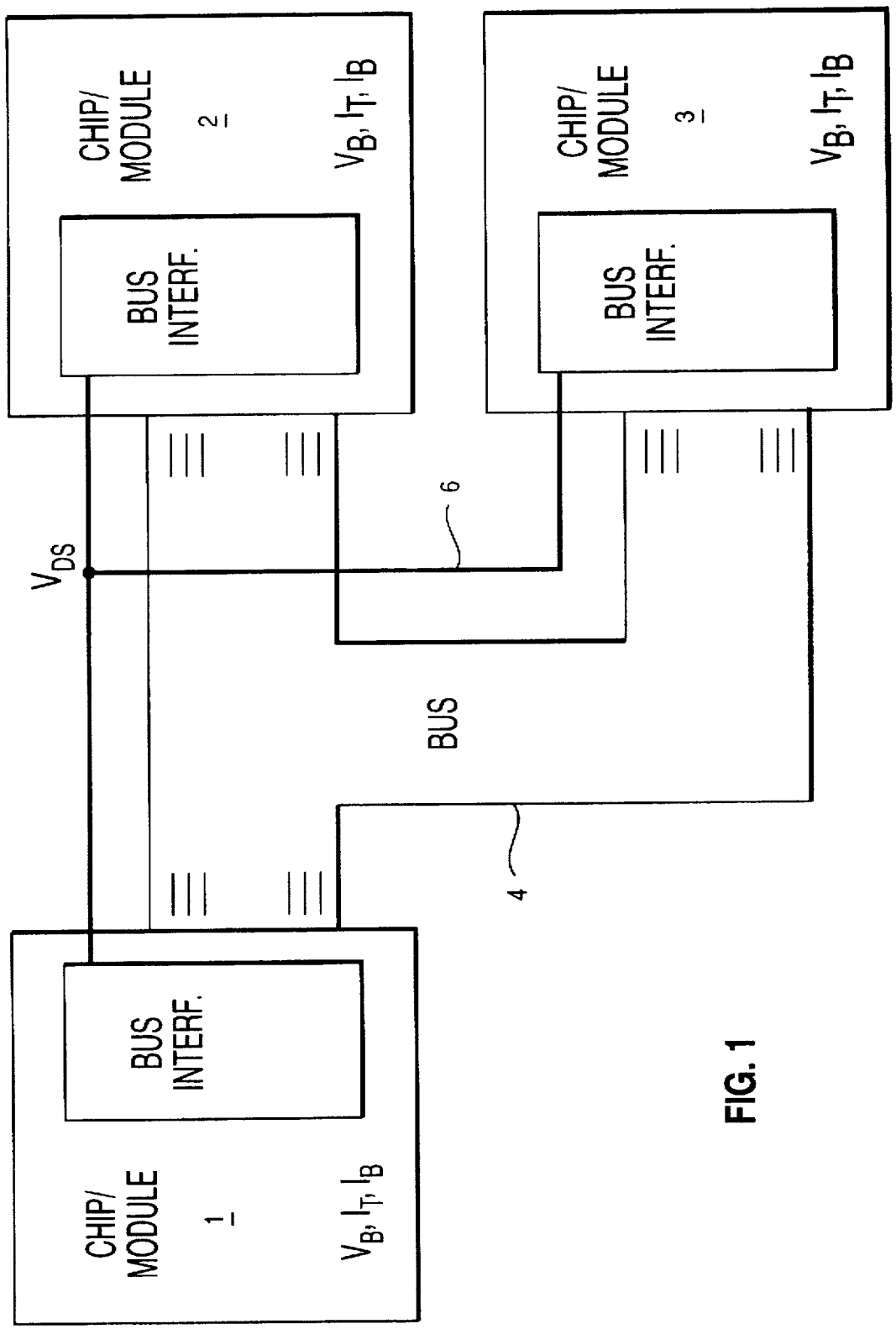
FIG. 1 is a schematic block diagram of a multiple chip/module system interconnected by a bus and a shared reference node.

FIG. 1 schematically illustrates the general context within which the present invention is practiced. As shown, multiple chips/modules 1, 2 and 3 are interconnected by point-to-point data transmission bus 4. In addition, a reference node 6 is shared by the bus interface circuits in the individual chips/modules. Node 6 is identified as having a voltage $V_{DS}$ established through the interaction of the bus interface circuits in the various chips. As would be expected, the individual chip/modules (hereinafter generally referred to as devices) have integrated circuit elements which differ materially in parameters such as threshold voltage and transconductance. Nevertheless, the objective is to transmit data between devices over bus 4 at high frequencies with minimum reflections as a consequence of transmission line termination mismatches. Therefore, the individual lines of bus 4 are biased and actively terminated to allow current source driving with substantially no reflectance at the receiving end.

The focus of the present invention is to provide within the bus interface circuits reference generation and termination apparatus which allows the transmission and receipt of data signals over the individual transmission lines of bus 4 with minimum reflection.

Figure 2:
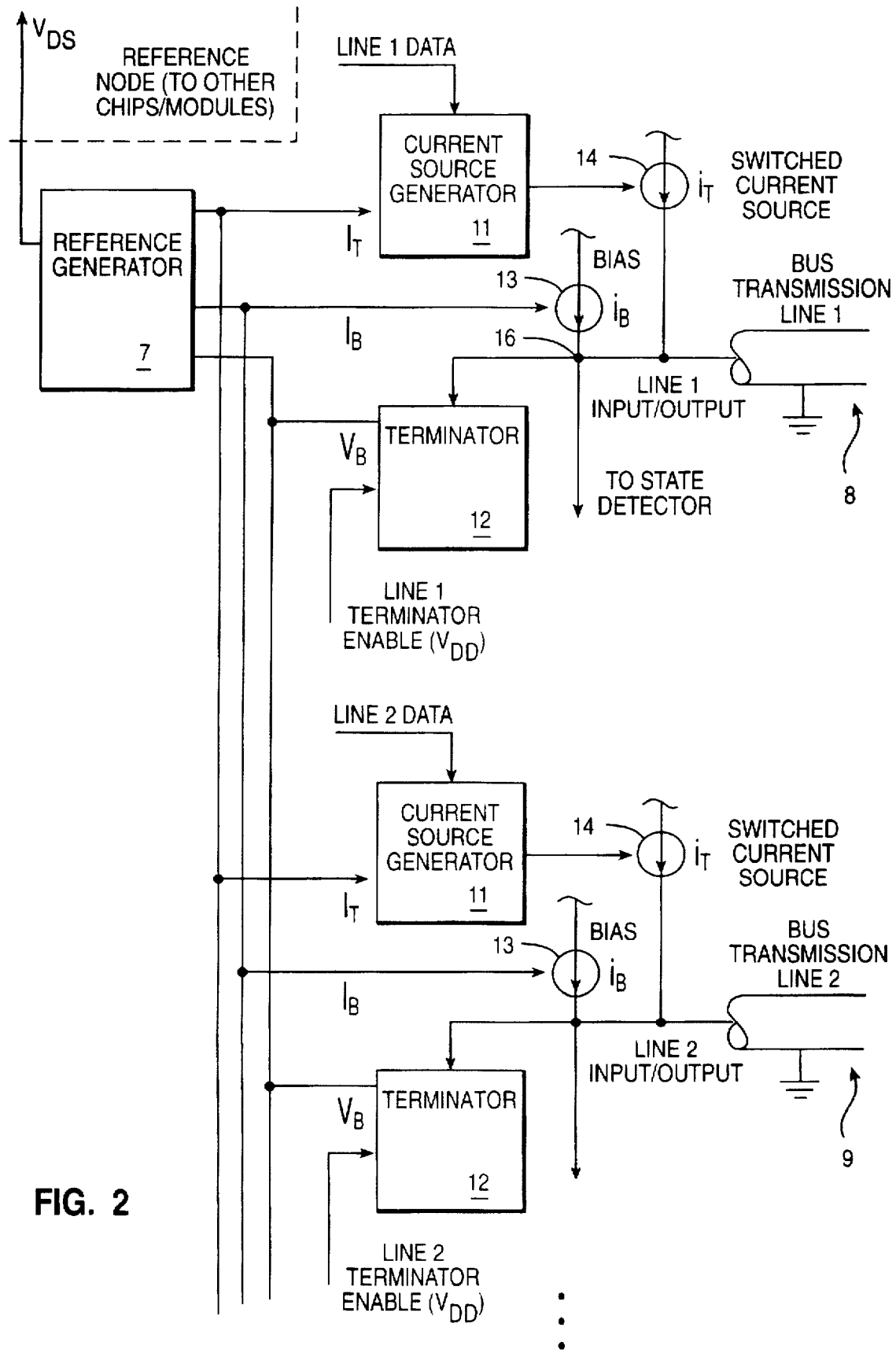
FIG. 2 is a schematic block diagram of a reference generator, and associated current source generators and terminators within a single integrated circuit chip or module.

FIG. 2 schematically illustrates portions of a bus interface as would appear within devices 1, 2 and 3 of FIG. 1, driving two of the multiple transmission lines which make up bus 4. Reference generator 7 is within a single device and as such reflects the characteristics of the other integrated circuit elements, field effect transistor, diodes, resistors, etc. within that device. Each bus line, such as the bus transmission lines at 8 and 9, has associated therewith a current source generator 11, a terminator 12, a bias current source 13, and a switched current source 14, the switched current source 14 providing the data state signal. For received signals, the state of the signal on bus line 8 is detected by monitoring the voltage level on node 16. Note that the bus transmission line at 9 has a corresponding set of elements, and further that the elements are responsive to the same three reference signals created in reference generator 7, namely, $I_T$, $I_B$, and $V_B$. The states or modes of operation of current source generator 11 and terminator 12 are respectively controlled by data input control signals and enablement control signals.

The embodiment depicted in FIG. 2 is generalized in that each line of the device is shown to include current source generator 11, and related switched current source 14 and bias current source 13, used for the transmission mode of operation, as well as terminator 12 and a detector connected to node 16, used when bus line 8 is operating in a receiving mode. Therefore, if bidirectional capabilities are not required then only portions of the elements would be connected to the bus line.

As earlier noted with reference to FIG. 1, each device 1, 2 and 3 includes the various elements depicted in FIG. 2 for each line of bus 4, when bidirectional transmission is contemplated between selected pairs of devices 1, 2 and 3. For example, if data is to be transmitted from device 1 to device 2, then current source generator 11, switched current source 14 and bias current source 13 would be operated in device 1, while terminator 12 and the detector connected to node 16 would be operated in device 2. Thereby, upon the receipt of data state by current source generator 11, switched current source 14 drives bus transmission line 8, and device 2 enables its terminator 12 to sink the switched current. The equivalent node 16 in device 2 then provides a signal to the detector in device 2 with minimum ripple as would otherwise be caused by reflections. The same relationship of elements applies, for example, if in the next sequence the transmission originates in device 3 and is directed to device 1, wherein now the current sources and terminators are appropriately configured to match the desired transmission and receipt configuration. In the event bidirectional transmission is contemplated between two devices, then all elements in the two devices are enabled. A mode of operation in which one of the three devices is monitoring the signals on the bus without contributing to the basic transmission and receipt operation will be described at a later stage.

The present invention is directed in particular to the matching of bias, data signal, and termination characteristics in the context of transmitting high speed data signals with minimum reflection between individual integrated circuit devices which are by nature of their fabrication not matched in electronic characteristics, in particular field effect transistor threshold voltage and transconductance. The aforementioned patent application introduces the concept of using a reference node to provide a matching standard among the integrated circuit devices. The present invention extends that fundamental concept through the refinement of reference generator 7 and the switched current sources to extend and improve the operating range over which matching of the current sources and sinks can be accomplished to minimize signal reflections on bus 4.

To overcome the lack of statistical dependence between the threshold voltage and the transconductance of field effect transistors in diverse devices, a different approach was pursued in defining the states of the current sources and terminator. It was known that for current source drivers with termination that the current preferably ranges from 0.010 to 0.013 amps. With this current and the knowledge that the characteristic impedance of a typical bus line is in the range of 50 ohms, the transmitted voltage was determined to be in the range of 0.5 to 0.65 volts. Since the latest technology CMOS field effect transistors have a nominal threshold voltage of 0.5 to 0.6 volts, the final voltage on an actively terminated line would range from 1.0 to 1.3 volts under such ideal termination conditions. In addition, it is known that the reference node conveys a common voltage, and that such voltage can be used as a reference for deriving the switched current levels in the interconnected devices. By selecting the reference node voltage as the final transmitted voltage, namely the 1.0–1.3 voltage, and noting the range of desired switched current and characteristic impedance, a controlling equation can be established between the parameters whereby $I_T \times Z_O$ equals $V_{DS}/2$. Thus $I_T$ equals $V_{DS}/2\, Z_O$. Since $V_{DS}$ is the desired reference and final voltage, the bias voltage $V_B$ naturally becomes $V_{DS}/2$. In doing this, the reference generator signals are all related to the final voltage on the transmission line, the impedance of the transmission line, and the bias voltage of $V_B$ is related to the field effect transistor characteristics as well as the reference node voltage.

The relationships so defined allows the use of a terminator biased with voltage $V_B$ in conjunction with current mirrors to match and selectively adjust by field effect transistor dimensional choices the switched current characteristics as well as the termination impedance characteristics. Similarly, since the bias level is defined to be a ratio of the referenced node voltage, the use of voltage division with current mirrors can be applied to establish consistent biasing within an integrated circuit device. Thus, in the context of the elements shown in FIG. 2, reference generator 7 provides a voltage $V_B$ which when driving terminator 12 ensures that the bias current responsive to $I_B$ creates a voltage on node 16 which is nominally half the voltage of $V_{DS}$.

Figure 3:
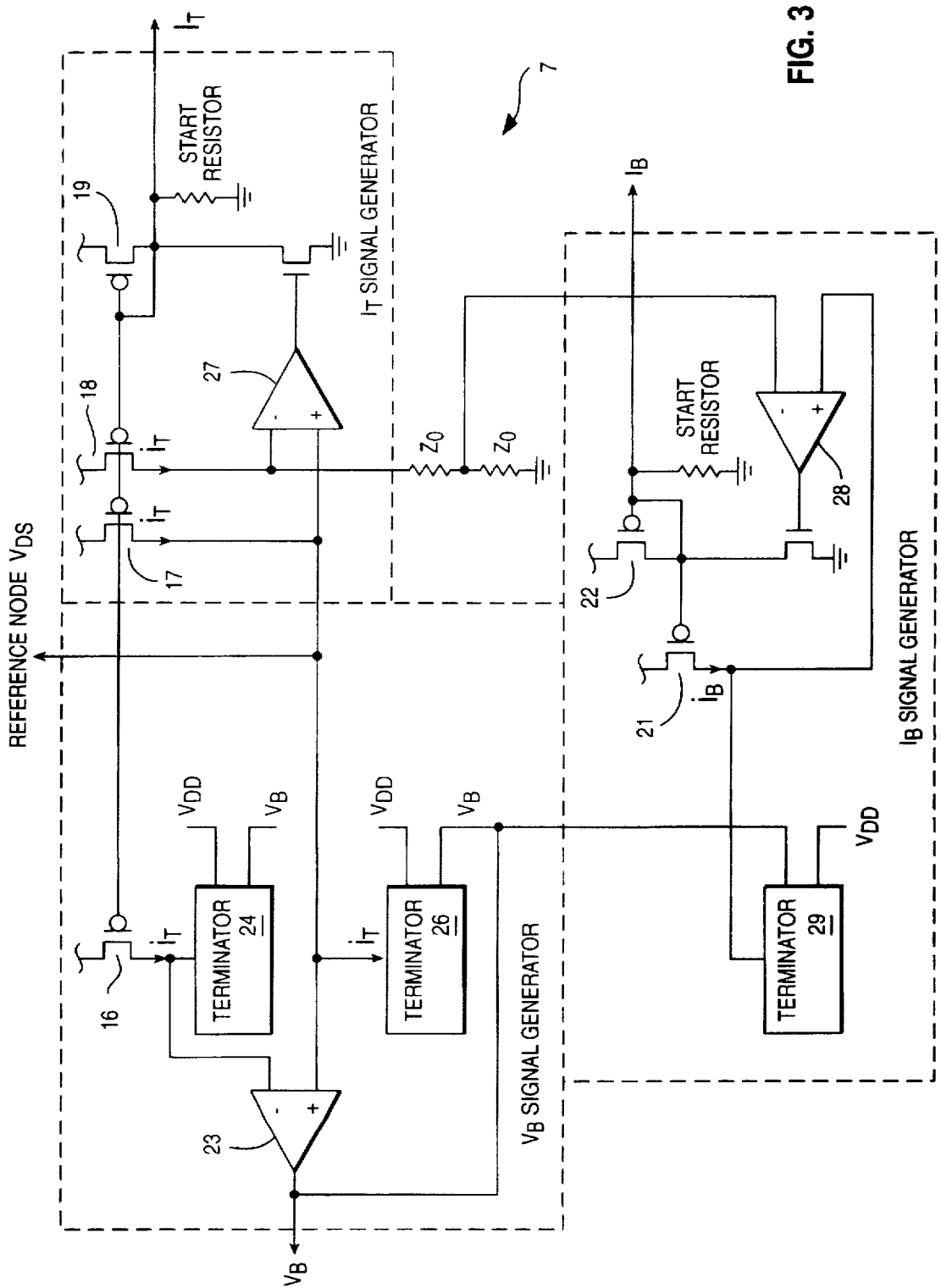
FIG. 3 is a schematic diagram of functional elements from within the reference generator, illustrating an embodiment suitable to generate various reference and bias signals responsive to the voltage level developed on the reference node shared by all the chips/modules.

Reference generator 7 is further detailed in FIG. 3 of the drawings. FIG. 3 shows the functional elements which generate the respective signals $V_B$, $I_T$ and $I_B$, as well as the reference node shared by the devices at a common node voltage of $V_{DS}$. Current mirror connected transistor 16, 17, 18 and 19 provide a consistent current $i_T$ within the integrated circuit device. Likewise as to current mirror connected field effect transistors 21 and 22 in establishing bias current $i_B$. Bias voltage $V_B$ is generated as an output of amplifier 23 in response to inverting and noninverting inputs sensing the voltages on dummy terminators 24 and 26, with each such terminator receiving a current mirror generated matched current $i_T$ and a bias voltage $V_B$.

Bias current control signal $I_T$ is generated by amplifier 27 so as to establish a correspondence between the reference node voltage $V_{DS}$ and the value of $i_T$ as applied to two series connected resistors $Z_O$, where $Z_O$ is the aforementioned characteristic impedance of the transmission line. Note that amplifier 27 regulates the current mirror voltage represented by the signal $I_T$.

The bias signal $I_B$ is generated through the action of amplifier 28 in comparing the voltage across terminator 29 when current $i_B$ is flowing to nominally half the reference node voltage $V_{DS}$ by a voltage tap providing the voltage value of $i_T \times Z_O$.

Since the reference node voltage $V_{DS}$ is common to all integrated circuit devices, the voltage sets a reference for the generators within each device. Thereupon, the reference generators within each device, such as reference generator 7 in FIG. 3, utilize terminators and current mirrors which are consistent within that integrated circuit device to establish in closed loop form bias levels and magnitudes which are consistent with a reference node voltage, and as such consistent with the other devices connected to data bus 4 (FIG. 1).

Figure 4:
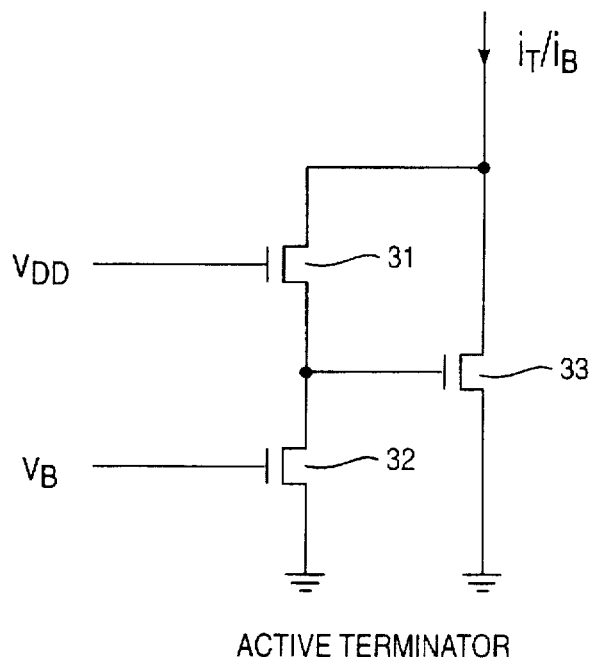
FIG. 4 is a schematic illustrating a representative active terminator circuit.

FIG. 4 schematically illustrates a field effect transistor configuration of a terminator. As presently embodied, the active terminator circuit in FIG. 4 corresponds to the terminators identified by reference numeral 12 in FIG. 2 as well as terminators 24, 26, and 29 in FIG. 3. Supply signal $V_{DD}$ allows transistor 31 to act as a fixed load of dimensionally specified value for bias transistor 32, where the gate voltage on transistor 32 is the bias voltage $V_B$. Since integrated circuit elements (transistors, etc) within a common integrated circuit device or chip are matched through simultaneous fabrication, bias voltage $V_B$ has a matching effect in each terminator of the integrated circuit device to establish a current value $i_B$ which is nominally half the value $V_{DS}$ when current $i_B$ is flowing through active terminator transistor 33.

Figure 5:
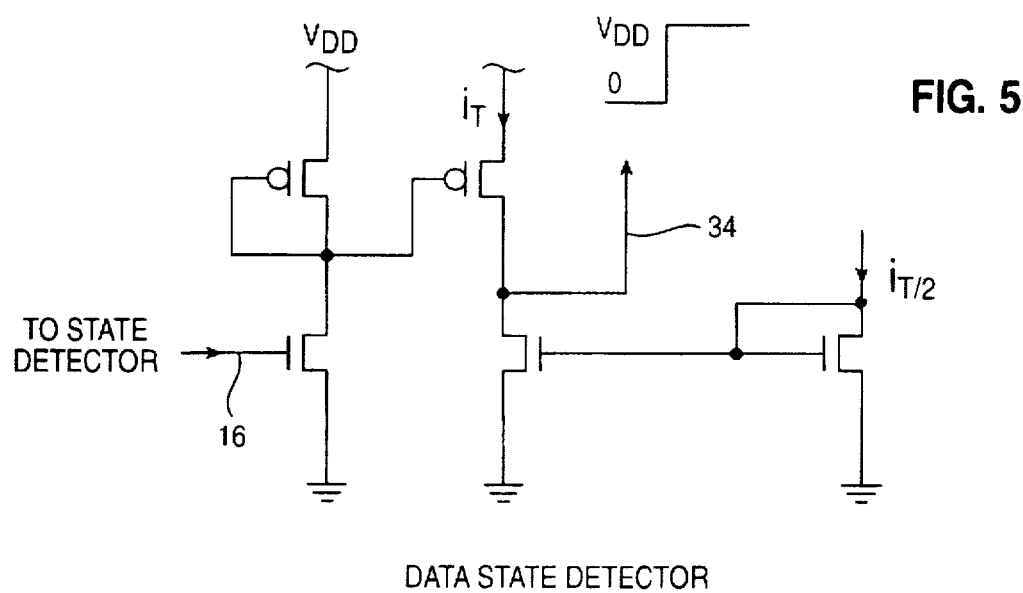
FIG. 5 is a schematic illustrating a representative data state detector circuit.

FIG. 5 illustrates one embodiment of a data state detector circuit of a type which can be connected to a transmission line at the receiving end, such as to node 16 in FIG. 2, to detect the binary state of a received signal when terminated in active terminator 12. The output at 34 transitions between voltage level 0 and $V_{DD}$ responsive to the receipt of a switched current of value $i_T$ over the transmission line 8. Note that the bias conditions which establish the bias voltage on the node 16 establish the 0 voltage output on line 34, while the receipt of a switched current source signal $i_T$ and associated increase of the bus transmission line 8 voltage on node 16 to a level corresponding to $V_{DS}$ provides an output of voltage $V_{DD}$ on line 34.

Since the voltage on the transmission line, whether the line is part of a bus or otherwise, switches between $V_{DS}/2$ and $V_{DS}$ in the transition between data states, and the signal $V_{DS}$ is distributed as a reference throughout the system, it is possible for integrated circuit devices which are neither transmitting nor receiving to monitor (snoop) the state of the line without introducing additional load on the line. To accomplish such monitoring, the snooping device does not utilize a terminator. However, such snooping device does incorporate an analogous reference generator responsive to a voltage $V_{DS}$ on the reference node to establish detection levels consistent with the integrated circuit elements within that device and the signal levels between the other devices in the system.

Simultaneous bidirectional transmission is also feasible. To accomplish such transmission multiple current levels are established by physical scaling of an integrated circuit transistor elements to create multiple incremental levels of switched current and detected voltage. Again, the use of $V_{DS}$ as a reference voltage in conjunction with current mirror circuits and field effect transistor dimensional scaling allows accurate signal generation, termination, and detection.

It will be understood by those skilled in the art that the embodiments set forth hereinbefore are merely exemplary of the numerous arrangements by which the invention may be practiced and as such may be replaced by equivalents without departing from the invention which will now be defined by appended claims.

I claim:

1. In a system having multiple integrated circuit devices interconnected through a transmission line bus, the bus being suited to transmit data signals between devices employing current source drivers and receivers, an apparatus operable to match current source drivers and receivers in two or more integrated circuit devices, comprising:

means for generating in a first device a reference signal nominally being twice the magnitude of the data signal transmitted between selected devices over one or more lines of the bus;

means for generating in the first device a first bias signal operable with a first terminator to regulate the reference signal;

means for generating a second bias signal operable to inject a first bias current into a first line of the bus; and a second terminator in the first device connected to the first line of the bus and responsive to the first bias signal and a first bias current injected by a second device into the first line to establish a voltage on the first line of the bus nominally half the reference voltage.

2. The apparatus recited in claim 1, further comprising:
means for generating a first data signal operable to switch a current source driving the first line of the bus.

3. The apparatus recited in claim 1, further comprising:
means for injecting a second bias current into a second line of the bus responsive to the second bias signal; and a third terminator in the first device connected to the second line of the bus and responsive to the first bias signal and a second bias current injected by the second device into the second line to establish a voltage on the second line of the bus nominally half the reference voltage.

4. The apparatus recited in claim 3, further comprising:
means for generating a second data signal operable to switch a current source driving the second line of the bus.

5. The apparatus recited in claim 2, wherein the switched current source driving the first line of the bus generates a current, the current magnitude being nominally half the value of the reference signal voltage divided by the characteristic impedance of the first line.

6. The apparatus recited in claim 4, wherein the switched current source driving of the second line of the bus generates a current, the current magnitude being nominally half the value of the reference signal voltage divided by the characteristic impedance of the second line.

7. The apparatus recited in claim 1, wherein the first and second terminators are substantially identical circuits.

8. The apparatus recited in claim 3, wherein the first, second and third terminators are substantially identical circuits.

9. The apparatus recited in claim 7, wherein a terminator comprises a set of inversion connected field effect transistors, with a load of a first stage having a field effector transistor of nominally resistive character and an input signal to the first stage being the first bias signal.

10. The apparatus recited in claim 8, wherein a terminator comprises a set of inversion connected field effect transistors, with a load of a first stage having a field effector transistor of nominally resistive character and an input signal to the first stage being the first bias signal.

11. The apparatus recited in claim 1, wherein the injection of the first bias current into the first line of the bus is accomplished in synchronism with the disablement of the second terminator.

12. The apparatus recited in claim 3, wherein the injection of the first bias current into the first line of the bus and the injection of the second bias current into the second lines of the bus are accomplished in synchronism with the disablement of the second and third terminators.

13. The apparatus recited in claim 1, further comprising:
means for connecting the reference signal to a reference signal generation means in the second device;

means for generating in the second device a third bias signal operable with a fourth terminator to adjust the reference signal;

means for generating in the second device a fourth bias signal operable to inject the first bias current into the first line of the bus; and a fifth terminator in the second device connected to the first line of the bus and responsive to the third bias signal and the first bias current injected by the first device into the first line to establish a voltage on the first line of the bus nominally half the reference signal.

14. The apparatus recited in claim 3, further comprising:
means for connecting the reference signal to a reference signal generation means in the second device;

means for generating in the second device a third bias signal operable with a fourth terminator to adjust the reference signal;

means for generating in the second device a fourth bias signal operable to inject the first bias current into the first line of the bus; and a fifth terminator in the second device connected to the first line of the bus and responsive to the third bias signal and the first bias current injected by the first device into the first line to establish a voltage on the first line of the bus nominally half the reference signal.

* * * * *